US008041014B1

(12) United States Patent
Daily et al.

(10) Patent No.: US 8,041,014 B1
(45) Date of Patent: Oct. 18, 2011

(54) AUTOMATED CALL HANDLING BASED ON CALLER ID

(75) Inventors: Daniel J. Daily, Westminster, CO (US); Christopher R. Gentle, New South Wales (AU); Lisa Y. Kawahara, Colorado Springs, CO (US); Ashis Maity, Arvada, CO (US); Michael J. Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 1388 days.

(21) Appl. No.: 11/551,142

(22) Filed: Oct. 19, 2006

(51) Int. Cl.
H04M 1/64 (2006.01)

(52) U.S. Cl. .................. 379/88.23; 379/207.15

(58) Field of Classification Search ............... 379/88.23, 379/88.19, 207.15
See application file for complete search history.

(56) References Cited

U.S. PATENT DOCUMENTS

| 4,293,740 | A | | 10/1981 | Gibb et al. | |
|---|---|---|---|---|---|
| 5,724,411 | A | * | 3/1998 | Eisdorfer et al. | 379/93.23 |
| 5,812,525 | A | * | 9/1998 | Teraslinna | 370/229 |
| 5,974,131 | A | * | 10/1999 | Malik | 379/215.01 |
| 6,535,596 | B1 | * | 3/2003 | Frey et al. | 379/201.01 |
| 7,554,968 | B1 | * | 6/2009 | Modarressi et al. | 370/352 |
| 7,715,881 | B1 | * | 5/2010 | Liu et al. | 455/564 |
| 2005/0008135 | A1 | * | 1/2005 | Bressler | 379/211.01 |
| 2005/0153729 | A1 | * | 7/2005 | Logan et al. | 455/550.1 |
| 2008/0139210 | A1 | * | 6/2008 | Gisby et al. | 455/445 |

OTHER PUBLICATIONS

Quantomertzix, "Answer the Phone Remotely in a Touchless Fashion", Available at http://www.quantometrix.com/Hand_Fre.html, 3 pages, 2005.
Quantomertzix, "Room Phone Intercom Systems", Available at http://www.quantometrix.com/ennovah_auto_answer.htm, 2, pages, 2005.
Washington State University, "ITE-30SD Telephone Station Feature Options", Available at http.//infotech.wsu.edu/communications/services/telephone/ite30features.htm, 11 pages, 2006.
Mobile Tracker, "Nokia sued for hands free answer technology", Available at http://mobiletraker.net/archives/2005/06/08/nokia-sued, 2 pages, Jun. 8, 2005.
"DEFINITY Generic 3 Call Vectoring/Expert Agent Selection (EAS) Guide," AT&T, 555-230-520, Issue 4, Sep. 1995, 458 pages.
DEFINITY®Enterprise Communications Server—Release 9.5, Avaya Communications, 555-233-503, Issue 4, Jul. 2001, 6 pages.

* cited by examiner

Primary Examiner — Creighton Smith
(74) Attorney, Agent, or Firm — Sheridan Ross P.C.

(57) ABSTRACT

A system and method for selectively answering incoming telephone calls based on a caller ID is disclosed. Selected calls may be handled with a number of call handling functions including an auto-answer function, a custom message function, and a custom call forwarding.

20 Claims, 4 Drawing Sheets

| Telephone Address | Special Treatment Identifier | Beginning Timestamp | Ending Timestamp | Other |
|---|---|---|---|---|
| xxx-xxx-xxxx yyy-yyy-yyyy zzz-zzz-zzzz ... | 1 2 3 ... | A.A.A C.C.C None ... | B.B.B D.D.D None ... | None E F ... |
| ← 500 | ← 504 | ← 508 | ← 512 | ← 516 |

*Fig. 5*

AUTOMATED CALL HANDLING BASED ON CALLER ID

FIELD OF THE INVENTION

The present invention relates generally to processing of incoming telephone calls.

BACKGROUND OF THE INVENTION

Under certain circumstances a person may be unable to answer his or her telephone. A person may be temporarily away from the phone, or perhaps near the phone but unable to answer the phone. Inability to answer a phone could be the result of, for example, an injury, sickness or the like. Alternatively, an elderly or sick person may be bedridden and unable to reach the phone. It may be the case, however, that the person is simply in another room and away from the phone.

Missing the incoming call may be only an inconvenience, but could have more serious consequences, particularly in the case of a sick or an elderly person. In particular, a friend or relative may be calling to check on the welfare of a sick person. The sick person may be in need of medical attention and urgently need to speak with the friend or relative. An unanswered call may force the person to drop what he or she is doing and go to check on the sick or elderly person. Alternatively, the person may panic and call emergency services. However, it may be the case that the person is merely sleeping and not in need of medical attention. As a result, calls to emergency services or other steps may be taken unnecessarily. Such situations could be avoided if the initial phone call were received by the sick or elderly person.

Other situations can be envisioned in which an inability to answer the phone can be at least an inconvenience. For example, pets do not have the ability to answer the phone. However, a pet owner may wish to be able to call home and "speak" to a pet through the speakerphone. Alternatively, a person may own voice-activated appliances. Such a person may wish to remotely activate the appliance over the phone. Additionally, a person may wish to record a message that is specific to a particular calling party or have a particular calling party forwarded to an alternative phone. Accordingly, it would be desirable to have a system that provides for automatic answering of a telephone.

SUMMARY OF THE INVENTION

These and other needs are addressed by the present invention. The present invention is directed generally to a call handling system incorporated into a voice communication device, such as a telephone.

In one embodiment of the present invention, the call handling system is responsive to the identity of the calling party and/or endpoint and is operable to select from a number call handling functions based on user programmable information. The call handling system may be programmed to store caller information related to parties for whom the user wishes to provide special treatment. The call handling system uses caller ID or a similar system to determine the identity of a calling party and then compares this information with the stored information. A match between the caller ID information and the stored information allows the call to be given special treatment. A number of call handling functions are within the scope of the invention including, automatic answering of the call, playing a custom message, and selectively forwarding the call.

The automatic answer function causes the phone to be answered without the normal intervention of a person who would answer the phone by removing the handset from the cradle or pressing a speakerphone button.

The custom message function causes a pre-recorded message to be played only to select calling parties.

The call forwarding function permits the user to have certain calls forwarded to a different phone. This function allows calls to be selectively forwarded based on their caller ID information.

The present invention may operate on telephones used in either packet switched or circuit switched environments. The functionality remains the same in different switching environments, however the implementation may vary.

The present invention can have a number of advantages. For example, regarding the automatic answer function the call handling system can provide more reliable communication with those parties that may not be able to reliably answer the phone. For instance, the caller can speak to a pet, someone who cannot answer the phone, or even listen to what is happening in the phone's location. In home child or elder care situations, this capability can be highly desirable. The feature may also be used to perform reverse 911, or universal emergency number, calls by an emergency service provider, such as the police and fire department. The provider can call and listen to what is happening in the vicinity of the called endpoint that previously attempted to call for emergency assistance. Although the useful range of the called endpoint is limited, multiple speakerphones placed around the house in desired locations can all be configured to automatically answer the same incoming call at substantially the same time. The caller would thus be able to listen effectively to events happening throughout the facility of the called party and could speak effectively to a person located anywhere in the house.

The custom message function is highly desirable as it permits the user to deliver selectively messages specific to the calling party. Unlike answering machines, the call must first ring as unanswered before messages can be played. All calls receive the same message treatment in that event. The present invention can permit the user to configure no rings before the selected call receives the custom message and to configure other calls to be announced normally over the phone. The user thus does not need to visually filter calls by viewing displayed caller ID information on the phone when each call is announced.

The call forwarding function is also highly desirable for residential users particularly in home-office applications. Urgent or incoming calls of high value can, for instance, be selectively forwarded to an alternative phone when the user is not at home.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The present invention is directed to an automated call handling system administered in a communication endpoint for use in processing incoming calls without human intervention. A number of call handling functions are considered within the scope of the invention including, an auto-answer function, a custom call message function, and a custom call forwarding function. The call handling system may be programmed to recognize a particular calling party based on caller ID information. The recognized calling party is then given special treatment which includes one of above listed call handling functions.

The automatic answer function causes the phone to be answered without the normal intervention of a person who would answer the phone by removing the handset from the cradle or by pressing a speakerphone button. In particular, the auto answer function simulates a press of the "speaker phone" button. As a result, the call is answered normally and the normal speakerphone capability of the phone is enabled. Accordingly, the calling party may speak to the user, or others in proximity to the phone despite their having taken no action to answer the phone.

Instead of automatically answering the phone, the user may choose to have a custom message played to the calling party. As such, the user may pre-record one or more messages each to be played only to particular calling parties. When these particular caller parties are identified by an inspection of caller ID information, the call-handling system proceeds to play their custom message. The custom message may be administered on an inclusive or exclusive basis. When administered inclusively, the custom message is played onto to callers having the referenced caller ID information. When administered exclusively, the custom message is played to callers other than callers having the referenced caller ID information.

As a third option, the user may wish to have certain calls forwarded to a different phone. This function allows calls to be selectively forwarded based on their caller ID information. The call forward destination may be another communication device endpoint, such as a remotely located wireless or wired phone, Personal Digital Assistant (PDA), or pager, or a voice messaging device, such as an answering machine.

Because the device endpoint administers the call handling system, the feature may be provided automatically without any ring on the called device or ring tone on the calling device being provided. Alternatively, a default number of rings may be played to give the called party the opportunity to answer the device before the auto-feature goes into effect. Alternatively, the user of the called communication device itself may administer whether any rings should be played and, if so, how many before the feature is automatically invoked.

In summary, the call handling system in the telecommunication endpoint integrates telecommunication features normally administered at a switch or server into the endpoint and provides private parties with a much more feature rich call handling system than is otherwise available with conventional phones.

Figure 1:
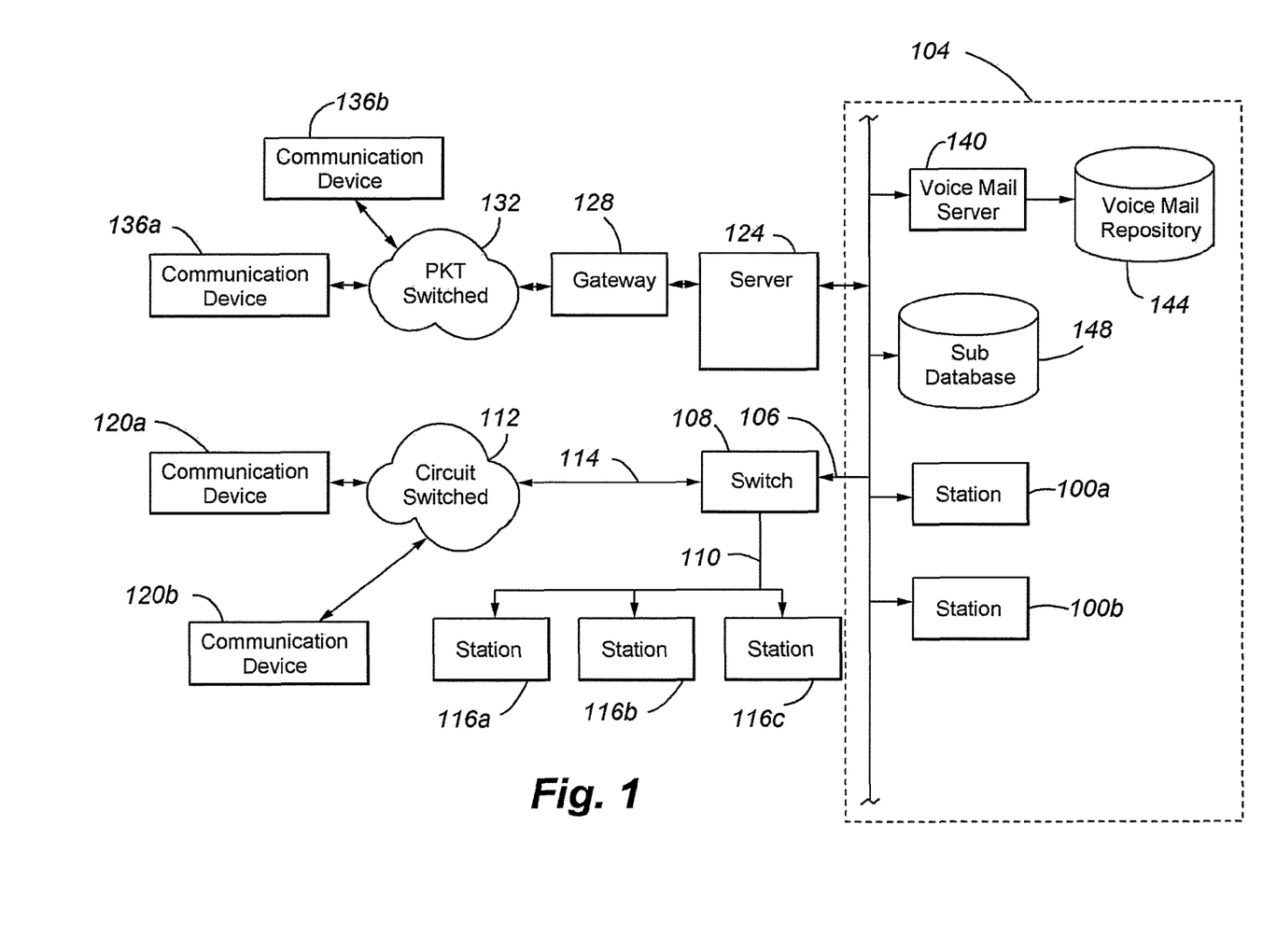
FIG. 1 is schematic depiction of components and feature of a call handling system in accordance with embodiment of the present invention.

With reference now to FIG. 1, components and features of a call handling system in accordance with embodiments of the present invention are illustrated. FIG. 1 shows a plurality of interconnected communications devices each of which may include a call handling system. Stations 100a and 100b are telecommunication devices associated with an enterprise network 104. Switch 108 provides a connection between the enterprise network 104 and external circuit switched network 112. The circuit switched network 112 may be, for example, the public switched telephony network (PSTN). The switch may be connected to other communication devices such as stations 116a, 116b, and 116c that are external to the enterprise network 104. FIG. 1 also shows additional circuit switched communication telecommunication devices 120a and 120b connected to the circuit switched network 112 at points further removed from the enterprise network 104.

The terms "switch", "server", and "switch and/or server" as used herein should be understood to include a PBX, an ACD, an enterprise switch, an enterprise server, or other type of telecommunications system switch or server, as well as other types of processor-based communication control devices such as media servers, computers, adjuncts, etc. The telephony switch 108 can be any architecture for directing contacts to one or more communication devices. Illustratively, the switch 108 of FIG. 1 can be Avaya Inc.'s Definity™ private-branch exchange (PBX)-based ACD system; or Nortel Networks' IPConnect™.

The external communication devices 120a-b and internal stations, or communication devices, 116a-c are circuit-switched and/or TDM devices, such as wired digital telephones. As will be appreciated, the devices may be plugged into a Tip Ring interface that causes electronic signals from the station to be placed onto a TDM bus (not shown). Each of the internal stations corresponds to one of a set of internal (Direct-Inward-Dial) extensions on its controlling switch/server. External communication devices are not administered by the switch 108 and/or server 124; in other words, external communication devices do not have an extension administered by the switch 108 and/or server 124. Specific examples of suitable devices are the 30010™, 2410™, and 2420™ Digital Telephones of Avaya, Inc.

The controlling switch/server can direct incoming contacts to and receive outgoing contacts from the internal communication devices in a conventional manner. The switch 108 is connected via a plurality of trunks 114 (which may be for example Primary Rate Interface, Basic Rate Interface, Internet Protocol, and H.323 trunks) to the network 112 and via link 106 to stations 100a-b and via link 110 stations 116a-c.

A call handling system in accordance with embodiments of the present invention, may also operate on communication devices used in connection with a packet switched network. Accordingly, the exemplary enterprise network shown in FIG. 1 also includes a server 124 and gateway 128 for connection with a packet switch network 132. The packet switched network 132 may be, for example, a data network such as the Internet. Also connected directly or indirectly to the packet switched network are external communication devices 136a-b and internal stations, or communication devices, 100a-b, such as Voice over Internet Protocol or VoIP hardphones (e.g., Avaya Inc.'s 4600 Series IP Phones™ and 9620™ IP telephones) or softphones (e.g., Avaya Inc.'s IP Softphone™).

The communication devices 100, 116, 124, and 136 are not limited to wired telephones but can be a number of other devices. Examples include wireless or cellular telephones, PDAs, pagers, H.320 video phones and conferencing units, voice messaging and response units, and traditional computer telephony adjuncts, and the like.

The enterprise network 104 additionally may include such components as a voice mail server 140, associated voice mail repository 144, and/or subdata base 148.

The gateway 128 may be, for example, Avaya Inc.'s, G700™, G650™, G600™, MCC/SCC™ media gateways. The gateway 128 is positioned logically between the server 124 and/or internal packet-switched stations 100 on the one hand and the packet switched network 132 on the other to process communications passing between the server 124 or stations 100 and the packet switched network 132.

It should be noted that the invention does not require any particular type of information transport medium or protocol between switch/server and stations and/or the switches/servers and external networks, i.e., the invention may be implemented with any desired type of transport medium as well as combinations of different types of transport media. For example, the inter-switch protocols may be QSIG, SIP, H.323, and the like. In addition to the circuit switched network 112 and the packet switched network 132, the contact center can include a connection to any network capable of supporting communications. Some types of communication networks that can be used in accordance with the present invention include, for example, a satellite communication network, an optical fiber communication network, a local area network, a wide area network, a municipal area network, a private branch exchange network, and/or a terrestrial wireless network.

Figure 2:
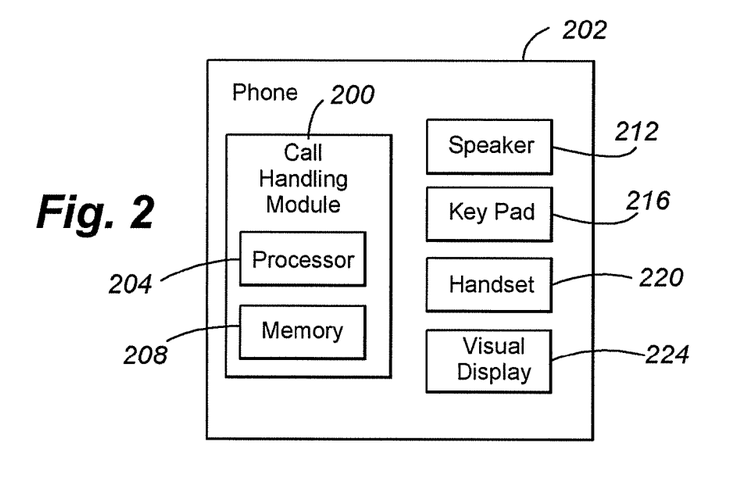
FIG. 2 is a schematic depiction of components of a telecommunication device in accordance with embodiments of the present invention.

FIG. 2 is a block diagram showing components and features a communication device 202 in accordance with embodiments of the present invention that includes an automated call handling module 200. The call handling module may include a processor 204 and memory 208. The communication device may also include other features such as speaker 212 for use with known "speaker phone" functions, a keypad 216 for dialing, and a handset 220. Additionally, the communication device may include a visual display 224 of information for use in programming the call handling module. Any of the internal or external communications devices illustrated in FIG. 1 may contain a call handling system in accordance with embodiments of the present invention.

The processor 208 is capable of executing program instructions. Accordingly, the processor 208 may include any general-purpose programmable processor, Digital Signal Processor (DSP) or controller for executing application programming. Alternatively, the processor 208 may comprise a specially configured application specific integrated circuit (ASIC). A processor 208 generally functions to run programming code implementing various functions performed by the call handling system.

The processor 204 may be associated with memory 208 for use in connection with the execution of the programming by the processor 204 and for the temporary or long-term storage of data or program instructions. The memory 208 may comprise solid state memory resident, removable or remote in nature, such as DRAM and SDRAM. Where the processor 204 comprises a controller, the memory 208 may be integral to the processor 204.

With reference now to FIG. 1 and FIG. 2, the functionality of the architecture will now be discussed with specific examples. Say, for example, that communication device 136a is associated with an elderly person who has recently had some health problems and occasionally has trouble getting out of bed. Furthermore, station 100b is an office phone associated with the daughter of the elderly person. In order to facilitate communication between the elderly parent and the daughter the call handling system in accordance with embodiments of the present invention is used. In particular, the call handling system associated with the communication device 136a is programmed to auto-answer calls from the communication station 100b. Accordingly, the daughter of the elderly parent may call to check on the welfare of the parent and the phone will be answered regardless of the parent's ability to answer the phone. The speakerphone will be enabled and the parent and the daughter will be able to talk normally. If, in fact, the parent is in need of help or perhaps medical attention he or she will be able to communicate this information to the daughter. In the absence of an automated call handling system and in the case that the parent's condition prevented him or her from answering the phone, this information would not have been communicated. As a result, the daughter may need to leave work to determine why the call was not answered. Alternatively, she may panic and call emergency services. This may result in unwanted cost if, in fact, the reason that the parent did not answer was not an emergency.

Other situations may require the use of the call-handling systems custom message function. Say, for example, a person is at work and associated with communication station 100a. He is expecting a call from his spouse who is associated with communication device 120a. Unfortunately, he will be away from his desk most of the day and unable to receive her call. Accordingly, he may program the call-handling system to recognize calls from communication device 120a and play a message recorded for the spouse only. Other calls originating from other communication device will be directed to a standard message or mailbox.

It should be understood that both telephone numbers and calling party names can be obtained from the caller ID information. The above examples were given for configurations that utilize telephone numbers obtained from caller ID information. However, the invention is not so limited. In particular, a certain call handling function may be associated with a name. Accordingly, if this person has more than one phone the call handling system will treat calls from each of these phones in the same manner. Continuing with the first example above, say that in addition to having a work phone 100b the person also has a cellular phone 120b. In this case, the call handling system associated with the elderly parent's phone 136a may be operable to automatically answer calls from both the work phone 100b and the cellular 120b.

Additionally, the call handling system may be programmed to handle calls from the same name or number differently at different times of the day. Continuing with the elderly parent example, say the parent wishes to have the phone automatically answered only in the mornings and in the evenings. In the afternoons, however, the parent takes a nap and does not wish to be disturbed. Accordingly, the parent may program a message for the daughter that informs her that the parent is sleeping.

Figure 5:
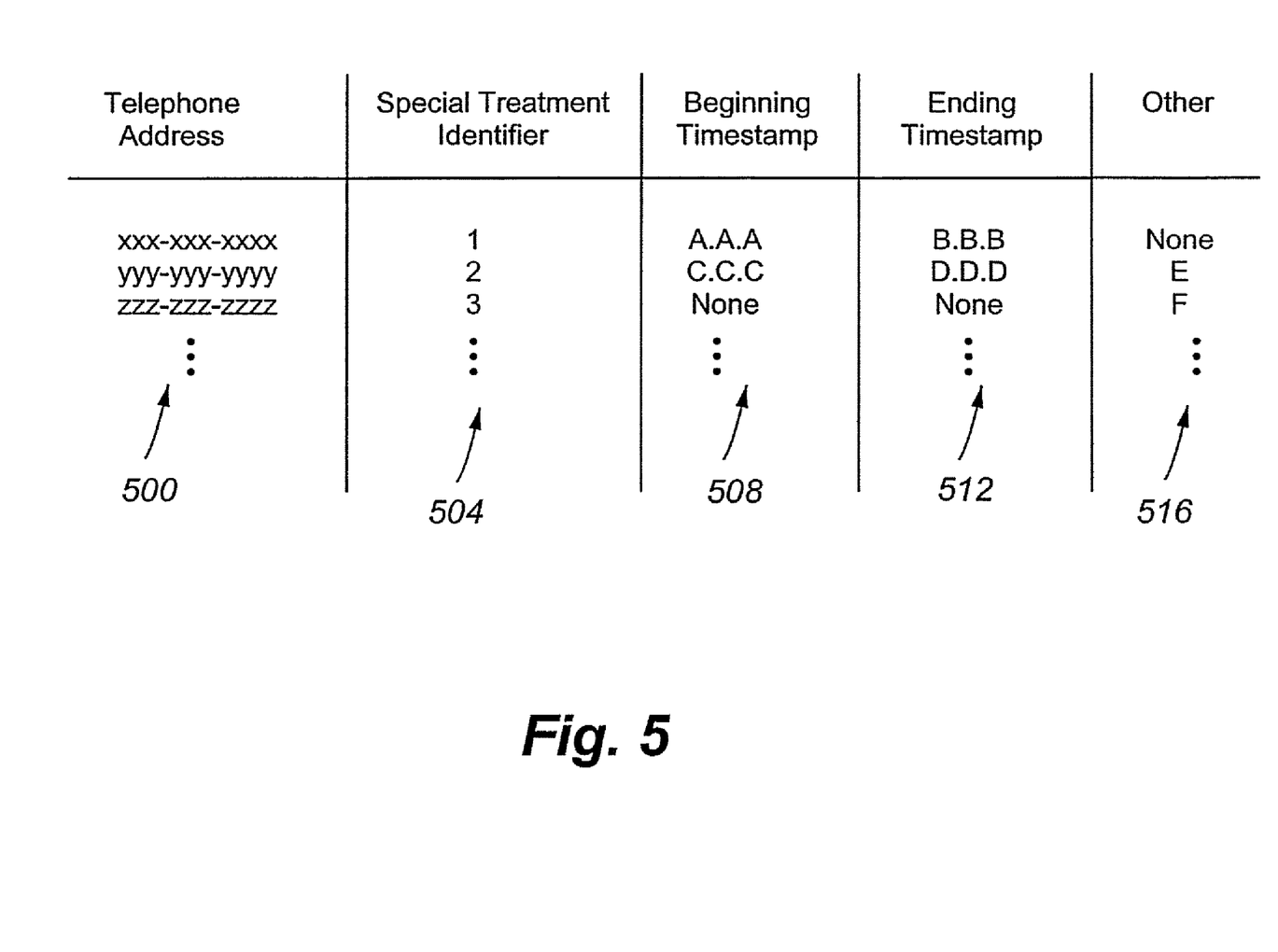
FIG. 5 is an exemplary data structure according to an embodiment of the present invention.

FIG. 5 shows data structures that are employed in one embodiment of the present invention. The data structures include caller ID information 500 (which is shown as being telephone address only), special treatment identifier 504, beginning and ending timestamps 508 and 512, and other information 516. As noted previously, caller ID information 500 can be a name, telephone address, or pairing thereof. The special treatment identifier 504 can have a number of values, each of which is associated with a different call handling option. In the example shown in FIG. 5, the value "1" is associated with auto-answering, "2" with a special message, and "3" with call forwarding. The beginning and ending timestamps 508 and 512 indicate when the associated call-handling feature is activated and deactivated, respectively. One of the entries is shown as having no timestamps, which means that the call handling option is activated indefinitely. Finally, other information depends on the associated call-handling feature. Entry "E" could be a pointer to a special message stored in the memory of the device 202 or an answering machine in communication with the device. When the call from having the referenced caller ID arrives, for example the device 202 forwards the call to the answering machine along with the pointer to indicate which of the plurality of messages in the answering machine is to be played. Entry "F" could be a telephone address of the device to which the call is to be forwarded automatically. The table is stored in memory 208.

Figure 3:
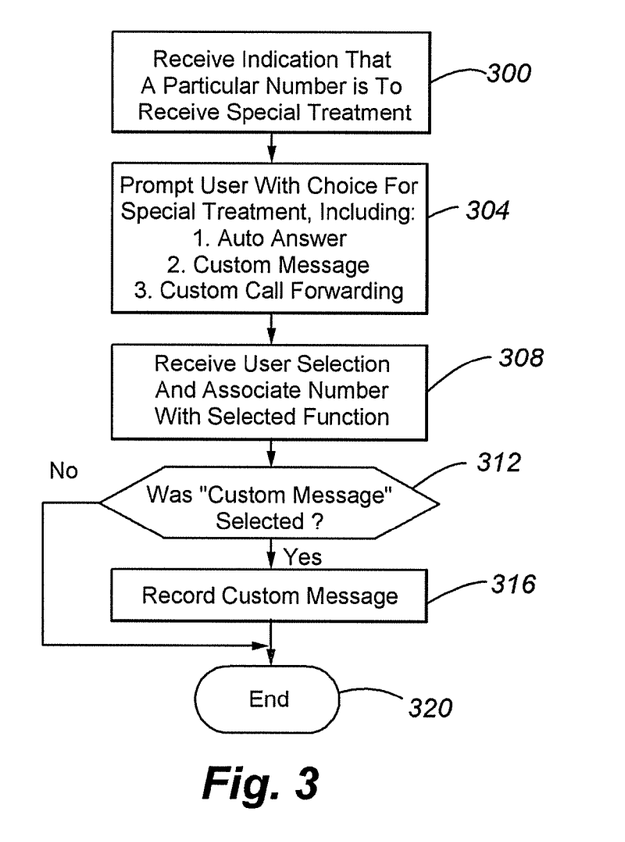
FIG. 3 is a flow chart depicting aspects of the operation of a call handling system in accordance with embodiments of the present invention.

FIG. 3 is a block diagram showing steps involved in programming the call handling module 200. Initially, at step 300, the telecommunications device receives an indication that a particular number is to be given special treatment. This indication can be provided in a number of ways. For example, the user may press a feature button disposed on the telecommunication device that allows the number to be entered directly. The information may be entered via a graphical user interface on the display 224. Alternatively, after the completion of a call the user may be provided with the option of designating the number as being entitled to special treatment. The user may also be provided with the option of giving a number special treatment after a given number has been dialed.

At step 304, the user is prompted with options regarding the number that he or she has indicated should be entitled to special treatment. This and other steps may be achieved by presenting a series of questions and instructions displayed on the visual display 224. Alternatively, audio prompts may be given over the handset 220 or the speaker 212. The call handling module provides a number of different ways in which a call may be treated, including being automatically answered, being given a custom message, or being forwarded to another phone. At step 304, the user is given the option of selecting one of these options to be applied to the number that he or she has chosen to receive special treatment. If desired, the user further enters beginning and/or ending timestamps 508 and 512.

At step 308, the user's selection is received and the chosen number is associated with the selected function. The number and the associated function may be stored in memory 208 by means of a table or other appropriate data structure, such as that of FIG. 5. If the auto-answer function or the custom call-forwarding function is chosen, then no further action is currently required and the operation may be allowed to end (step 320). If, however, the custom message option is chosen then a message to be given only to the chosen number must be recorded. Accordingly, at decision diamond 312, a determination is made if the custom message option was chosen. If this was the case, the message is recorded (step 316) before the operation is allowed to end. In one configuration, the message is recorded directly into memory of the telephone. In another configuration, the message is recorded into the memory of an associated answering machine. In this configuration, the device 202 would signal the answering machine that the user has selected the custom message option, the answering machine would then assume that the next recorded message is a custom message, and, after the custom message is recorded, return to the device 202 an identifier, such as a pointer, so that the custom message may be retrieved readily when an incoming call arrives.

Figure 4:
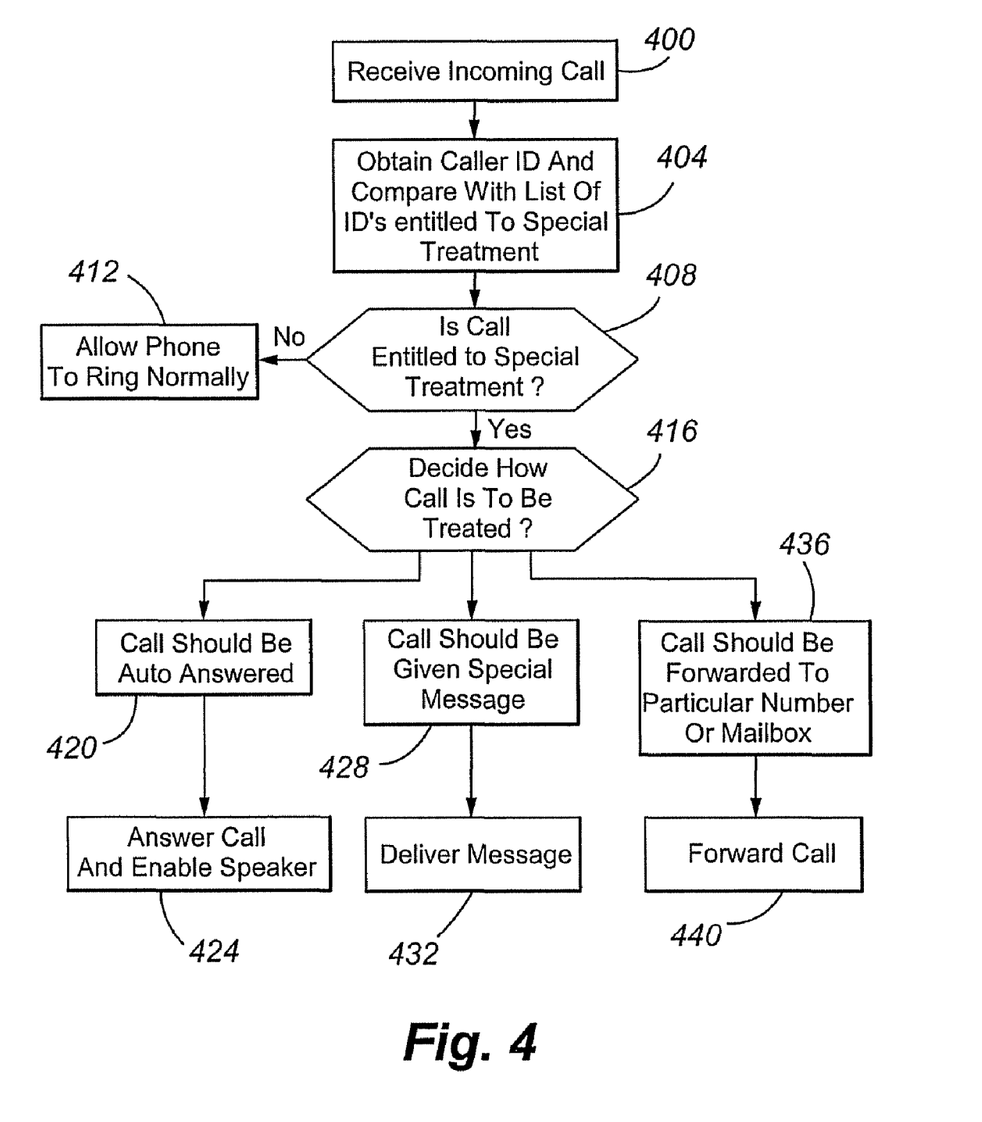
FIG. 4 is flow chart depicting aspects of the operation of a call handling system in accordance with embodiments of the present invention.

FIG. 4 is a block diagram illustrating an operation of the call handling module 200 in accordance with embodiments of the present invention. Initially, at step 400 an incoming call is received. At step 404, information related to the calling party is extracted from the caller ID information in the call set up messages. A comparison is then made between this information and the list of those numbers, such as in the data structures shown in FIG. 5, that are to be given special treatment.

At decision diamond 408, a determination is made as to whether or not the incoming call should be given special treatment. If there is no match between the calling party and those parties that have been designated to receive special treatment, then the phone is allowed to ring normally (step 412). If, however, a match is found the decision diamond 416 follows.

At decision diamond 416, it is determined which of the call-handling functions has been associated with the calling party. It may be determined that call should be auto answered (step 420). If this is the case, step 424 follows. In one configuration, this step includes a simulated press of the phone's buttons. In the case of the auto-answer feature, the speakerphone button is simulated by playing the tones associated with activation of the button. As is known, pressing the speakerphone button when the phone is ringing causes the phone to be answered while the handset remains in the handset cradle. This is achieved by providing both a speaker and a microphone on the face of the phone. This common telephone capacity is automatically enabled by the call handling system to allow the calling party to communicate with those in proximity to the phone.

It may be determined that the call should be given a special prerecorded message (step 428). If this is the case, then step 432 follows. This step consists of playing or otherwise appropriately delivering the recorded message to the calling party. This function allows the user to deliver customized messages to individual people who may be calling. In one configuration, the device answers the call automatically in the same manner as a conventional answering machine and plays the custom message. In another configuration, the device forwards the call to the answering machine and informs the machine of which custom message is to be played.

It may be determined that the call should be forwarded to a particular number or mailbox. If this is the case, then step 440 follows. As is known, certain telephones allow the transfer of calls from one phone to another. This is achieved by pressing a button disposed on the face of the phone associated with the desired extension to which the call is to be transferred. This common telephone capability is automatically enabled by the call handling system to accomplish the call transfer. For example, tones are played to cause the phone to be taken off-hook (or the call answered) and simulate activation of the "transfer" or "conference" button, and DTMF digits associated with the telephone address of the device to which the device is to be forwarded are played. When the call is answered, the telephone again simulates activation of the "transfer" or "conference" button and the device then disconnects. In accordance with embodiments of the present invention, the transfer may be accomplished by a simulated press of a call transfer button.

Alternatively, in a packet switched environment, any of the features may be implemented readily using control messages sent in packets. In this case, it is not necessary to simulate or emulate key or button presses. For example, the greater level of intelligence offered by packets may be utilized to accomplish the call transfer. In particular, after a determination is made that the call should be transferred, a packet may be sent from the phone to switch providing redirection instructions.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    receiving an incoming voice call at an endpoint associated with a called party;
    determining, by the endpoint, an identity of a calling party and/or device;
    determining, by the endpoint, that the incoming voice call is entitled to special treatment; and
    in response to determining that the incoming voice call is entitled to special treatment, the endpoint automatically forwarding the call to a second communication device, wherein the endpoint forwards the call to the second communication device by automatically playing one or more tones which cause the endpoint to be taken off-hook.

2. The method of claim 1, wherein the identity of the calling party and/or device is the name of the calling party.

3. The method of claim 1, wherein determining that the incoming voice call is entitled to special treatment includes the sub-steps:
    determining whether a set of time constraints is associated with the determined special treatment;
    determining whether the set of time constraints permit the determined special treatment to be currently used;
    when the set of time constraints permit the determined special treatment to be currently used, the incoming call is entitled to special treatment; and
    when the set of time constraints do not permit the determined special treatment to be currently used, the incoming call is not entitled to special treatment.

4. The method of claim 1, wherein step (c) includes the sub-steps:
    (c1) determining whether a set of time constraints is associated with the determined special treatment;
    (c2) determining whether the set of time constraints permit the determined special treatment to be currently used;
    (c3) when the set of time constraints permit the determined special treatment to be currently used, the incoming call is entitled to special treatment; and
    (c4) when the set of time constraints do not permit the determined special treatment to be currently used, the incoming call is not entitled to special treatment.

5. The method of claim 4, wherein the ones are DTMF tones and wherein a conference feature is simulated.

6. The method of claim 1, wherein, after the call is received at the endpoint, the endpoint automatically transmits one or more control packets to a switch to accomplish the call forwarding.

7. The method of claim 6, wherein the one or more control packets comprise redirection instructions for the switch.

8. The method of claim 1, wherein forwarding the voice call to the second communication device comprises conferencing the endpoint with the second communication device and the calling party.

9. The method of claim 8, wherein no ring is played by the endpoint before automatically forwarding the voice call to a second communication device.

10. The method of claim 1, wherein forwarding the voice call to the second communication device comprises automatically transferring the voice call to the second communication device and disconnecting the endpoint from the voice call.

11. A non-transitory and tangible computer readable medium comprising processor executable instructions that, when executed by a processor, perform the steps of claim 1.

12. A voice communication endpoint associated with a called party, comprising:
    a speaker;
    a key pad;
    a visual display; and
    a memory comprising a call handling module, the call handling module being operable to:
        receive a voice call;
        determine an identity of a calling party and/or device associated with the received voice call;
        determine, based on the determination of the identity of the calling party and/or device, that the received voice call is entitled to special treatment; and
        in response to determining the identity of the calling party and/or device, automatically forward the received voice call to a second communication device, wherein the endpoint plays at least one audible ring to announce to the called party the incoming voice call before automatically forwarding the received voice call to a second communication device.

13. The endpoint of claim 12, wherein the identity of the calling party and/or device is the name of the calling party.

14. The endpoint of claim 12, wherein determining that the received voice call is entitled to special treatment includes the sub-operations:
- determining whether a set of time constraints is associated with the determined special treatment;
- determining whether the set of time constraints permit the determined special treatment to be currently used;
- when the set of time constraints permit the determined special treatment to be currently used, the received voice call is entitled to special treatment; and
- when the set of time constraints do not permit the determined special treatment to be currently used, the received voice call is not entitled to special treatment.

15. The endpoint of claim 12, wherein the endpoint forwards the voice call to the second communication device by automatically playing one or more tones which cause the endpoint to be taken off-hook and after the endpoint is taken off-hook, the endpoint automatically simulates activation of a transfer or conference feature by playing one or more tones associated with a telephone address of the second communication device.

16. The endpoint of claim 15, wherein the ones are DTMF tones and wherein a conference feature is simulated.

17. The endpoint of claim 12, wherein, after the voice call is received at the endpoint, the endpoint automatically transmits one or more control packets to a switch to accomplish the call forwarding.

18. The endpoint of claim 17, wherein the one or more control packets comprise redirection instructions for the switch.

19. The endpoint of claim 12, wherein forwarding the voice call to the second communication device comprises conferencing the endpoint with the second communication device and the calling party.

20. The endpoint of claim 19, wherein forwarding the call to the second communication device comprises automatically transferring the voice call to the second communication device and disconnecting the endpoint from the voice call.

\* \* \* \* \*

UNITED STATES PATENT AND TRADEMARK OFFICE
CERTIFICATE OF CORRECTION

| | |
|---|---|
| PATENT NO. | : 8,041,014 B1 |
| APPLICATION NO. | : 11/551142 |
| DATED | : October 18, 2011 |
| INVENTOR(S) | : Daniel J. Daily et al. |

It is certified that error appears in the above-identified patent and that said Letters Patent is hereby corrected as shown below:

At Column 9, line 56, after "forwarding the" insert --voice-- therein.

At Column 9, line 57, after "forwards the" insert --voice-- therein.

At Column 10, line 8, before the word "call" insert --voice-- therein.

At Column 10, lines 9-20, delete the entirety of claim 4 and replace it with the following: --The method of claim 1, wherein after the endpoint is taken off-hook, the endpoint automatically simulates activation of a transfer or conference feature by playing one or more tones associated with a telephone address of the second communication device.--.

At Column 10, line 21, after "wherein the" delete the word "ones" and replace it with --tones-- therein.

At Column 10, line 23, after "wherein, after the" insert --voice-- therein.

At Column 10, line 63, delete "incoming" and replace it with --received-- therein.

At Column 10, line 64, delete "a" and replace it with --the-- therein.

At Column 12, line 1, delete "ones" and replace it with --tones-- therein.

At Column 12, line 14, after "wherein forwarding the" add --voice-- therein.

Signed and Sealed this
Twelfth Day of June, 2012

David J. Kappos
*Director of the United States Patent and Trademark Office*